United States Patent
Murakami

Patent Number: 5,848,156
Date of Patent: Dec. 8, 1998

[54] COMMUNICATION METHOD AND APPARATUS FOR CARRYING OUT CIPHER COMMUNICATIONS TELEPHONICALLY

[75] Inventor: Yasuyuki Murakami, Uji, Japan

[73] Assignee: Murata Kikai Kabushiki Kaisha, Kyoto, Japan

[21] Appl. No.: 659,666

[22] Filed: Jun. 5, 1996

[30] Foreign Application Priority Data

Jun. 30, 1995 [JP] Japan .................................. 7-166377

[51] Int. Cl.⁶ .............................. H04L 9/00; H04K 1/02
[52] U.S. Cl. ................................ 380/21; 380/18; 380/9
[58] Field of Search .................................. 380/9, 18, 21, 380/30, 43, 49

[56] References Cited

U.S. PATENT DOCUMENTS

| | | | |
|---|---|---|---|
| 4,182,933 | 1/1980 | Rosenblum | 380/21 |
| 5,241,595 | 8/1993 | Kuno | 380/21 X |
| 5,253,293 | 10/1993 | Shigemitsu et al. | 380/18 X |
| 5,289,542 | 2/1994 | Kessler | 380/30 X |
| 5,574,785 | 11/1996 | Ueno et al. | 380/21 X |
| 5,671,285 | 9/1997 | Newman | 380/30 |

Primary Examiner—Elizabeth L. Dougherty
Assistant Examiner—Paul D. Amrozowicz
Attorney, Agent, or Firm—Armstrong, Westerman, Hattori, McLeland & Naughton

[57] ABSTRACT

A communication method that can easily carry out cipher communication. At the caller, a secret key is produced based on data including the caller's own telephone number and the telephone number of the called station, and then image data is transmitted after enciphering it based on that secret key. At the called station, modem signal data including the telephone number of the caller transmitted during the ring off period of the call tone is received, the telephone number of the caller is detected from among that received data and a secret key is produced based on the telephone numbers of the caller and the called station. Afterwards when coded data is received, the coded data is deciphered based on that secret key and printed out.

7 Claims, 4 Drawing Sheets

COMMUNICATION METHOD AND APPARATUS FOR CARRYING OUT CIPHER COMMUNICATIONS TELEPHONICALLY

BACKGROUND OF THE INVENTION

1. Field of the Invention

The present invention relates to a communication method that enciphers and communicates data for facsimile communication.

2. Description of the Related Art

Recently, cipher communication that enciphers and communicates image data has been proposed as a method for realizing confidential communication for facsimile communication. According to this cipher communication, even if the communication data is tapped from the telephone lines, the confidentiality of the image data can be maintained providing the code is not deciphered.

The following conventional communication method has been proposed as one method of this kind of cipher communication. In this conventional method, the image data is transmitted after being enciphered based on a predetermined key input by an input operation at the caller side. When the coded data is received at the reception side, a key common with that used in the aforementioned transmission side is input by an input operation at the reception side, the coded data is deciphered based on that common key and is printed out. However, in the aforementioned conventional cipher communication, it is necessary to decide on the key to be used between the transmission and reception side by beforehand conferring by telephone, for example. Moreover, it is necessary to operate a predetermined switch on the operation panel and input the key. Therefore, not only does cipher communication become complicated and troublesome but, when the key is erroneously entered, the coded data cannot be deciphered at the reception side. Additionally, when there are a plurality of parties to which cipher communication is transmitted, normally a different key must be prepared for each party and if the number of parties increases, management of the keys becomes complicated and troublesome.

SUMMARY OF THE INVENTION

In order to solve the aforementioned problems, it is an object of the present invention to propose a communication method that, when cipher communication is to be carried out, does not need the conferring or input operation of the key, where the key can be simply managed and where cipher communication can be easily and reliably carried out.

In North America, a service called "Caller-ID" using the telephone lines is in operation. When an intermittent call tone (Bell tone: 2 seconds, Off period: 4 seconds) is transmitted to the called station based on a call from the caller, this service transmits data such as the caller telephone number to the called station as a 1200 bps modem signal during the ring off period of that call tone. Also, this service can presumably be expanded so that the caller can optionally transmit registered numbers and symbols in addition to the telephone number.

In order to achieve the aforementioned object, the present invention was devised with the above service in mind. In a first aspect of the present invention, there is disclosed a communication method that not only enciphers data based on a predetermined key and transmits that data but also deciphers the received coded data based on a predetermined key, produces the aforementioned key at the calling side based on data including at least the caller's own telephone number and produces the aforementioned key at the called side based on data including at least the telephone number of the caller transmitted in the ring off period of the call tone.

According to the first aspect of the invention, at the caller, a key is produced based on data including at least the caller's own telephone number and the enciphering of data or the deciphering of coded data is carried out based on that key. Because the data of the caller's own telephone number is registered in the device normally, it is possible to automatically produce that key without entering the key at times of cipher communication. At the called station, data including the telephone number of the caller transmitted during the ring off period of the call tone is received and a key is produced based on at least that data. Then, enciphering of the data or deciphering of the coded data is carried out based on that key. Accordingly, even at the called station, a key can be automatically produced without a special operation at times of cipher communication.

That is, according to the first aspect of the present invention, there is no need for discussion and input operations of a key when cipher communication is to be carried out. Therefore, management of the key can be easily performed and cipher communication can be easily and reliably carried out.

In a second aspect of the present invention, the caller produces a secret key based on the caller's own telephone number and the telephone number of the called station, and transmits the data after enciphering it based on that secret key. The called station produces a secret key based on data including the telephone number of the caller transmitted during the ring off period of the call tone and the receiver's own telephone number, and deciphers the received coded data based on that secret key.

According to the second aspect of the present invention, at the caller, by simply entering the telephone number of the called station in order to carry out cipher communication, the secret key can be automatically produced based on that telephone number and the caller's own telephone number. Then, the data is enciphered based on that secret key and transmitted. At the called station, the data including the caller's telephone number transmitted during the ring off period of the call tone is received and a secret in common with the caller is automatically produced based on that data and the called station's own telephone number. Then the received coded data is deciphered based on that secret key.

That is, according to the second aspect of the present invention, when cipher communication is to be carried out, a secret key to be used in common with both the caller and called station is automatically and easily produced.

In a third aspect of the present invention, the called station processes data including the telephone number of the caller transmitted during the ring off period of the call tone into a public key and transmits the data after enciphering it based on that public key. The caller produces a secret key based on data including the caller's own telephone number and deciphers the received coded data based on that secret key.

According to the third aspect of the present invention, at the called station, data including the caller's telephone number transmitted during the ring off period of the call tone, for example, symbols and numbers registered by that caller in addition to the telephone number of the caller, is received and that data is used as a public key. Then, data is transmitted after being enciphered based on that public key. At the caller, a secret key is produced based on the data including the caller's own telephone number in short the same data which was sent to the called station and the received coded data is deciphered based on that secret key.

That is, according to the third aspect of the present invention, the caller can receive coded data from the called station when it so requests and the secrecy of the received data can be more reliably maintained.

DETAILED DESCRIPTION OF THE PREFERRED EMBODIMENTS

Below, a first embodiment realizing the present invention as a facsimile device will be described with reference to FIGS. 1 to 5.

Figure 1:
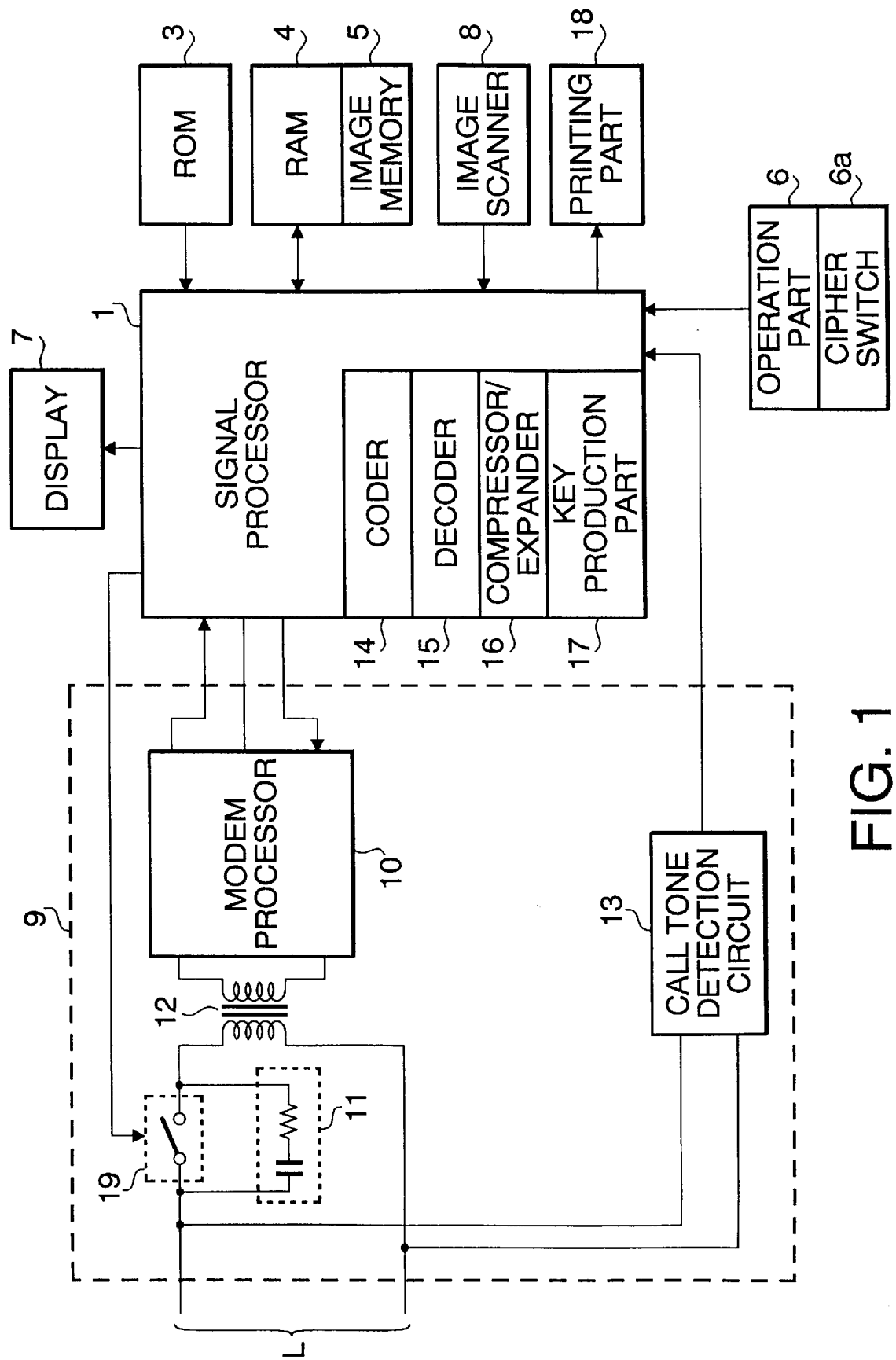
FIG. 1 is a diagram of the circuit structure of the facsimile device of the first embodiment of the present invention.

As shown in FIG. 1, a signal processor 1 including a CPU is provided for controlling the operations of the entire facsimile device and is provided with a coder 14, decoder 15, compressor/expander 16 and key production part 17.

For cipher communication, the coder 14 enciphers the transmission image data and the decoder 15 deciphers the received image data.

Compressor/expander 16 compresses the transmission image data in order to compress redundant image data and expands the received image data. It should be noted that, at times of cipher communication, the compressor/expander 16 compresses image data enciphered at the coder 14 and expands compressed data received in a coded state.

Key production part 17 produces keys used for enciphering of the transmission data and deciphering of the coded data. The key used in the present embodiment is a secret key produced based on the machine's own telephone number and the telephone number of the called party. This secret key is common between the transmission and reception side. The aforementioned coder 14 and decoder 15 carry out enciphering of the transmission data and deciphering of received coded data by a predetermined secret key enciphering method based on that secret key.

ROM (Read Only Memory) 3 stores the programs necessary for the operations of the signal processor 1. RAM (Random Access Memory) 4 is provided with an image memory 5 and the transmission image data and received image data is memorized in this image memory 5 in a compressed state. RAM 4 memorizes various information such as the telephone number of the machine in which it is provided.

Line control part 9 includes an AC coupler 11, transformer 12, modem processor 10, call tone detection circuit 13 and relay 19. AC coupler 11 includes a capacitor and a resistor and carries the modem signal (later described) contained between the call tone transmitted along the telephone lines L. Modem processor 10 includes, for example, a protocol signal generation circuit that generates the protocol signals necessary for execution of the facsimile communication procedures, a protocol signal detection circuit that detects those protocol signals and a modulation/demodulation circuit that modulates and demodulates the aforementioned modem signal and transmission/reception image data. Call tone detection circuit 13 detects the call tone on the telephone lines L. Relay 19 makes or breaks the telephone lines L by the control of the signal processor 1.

Figure 4:
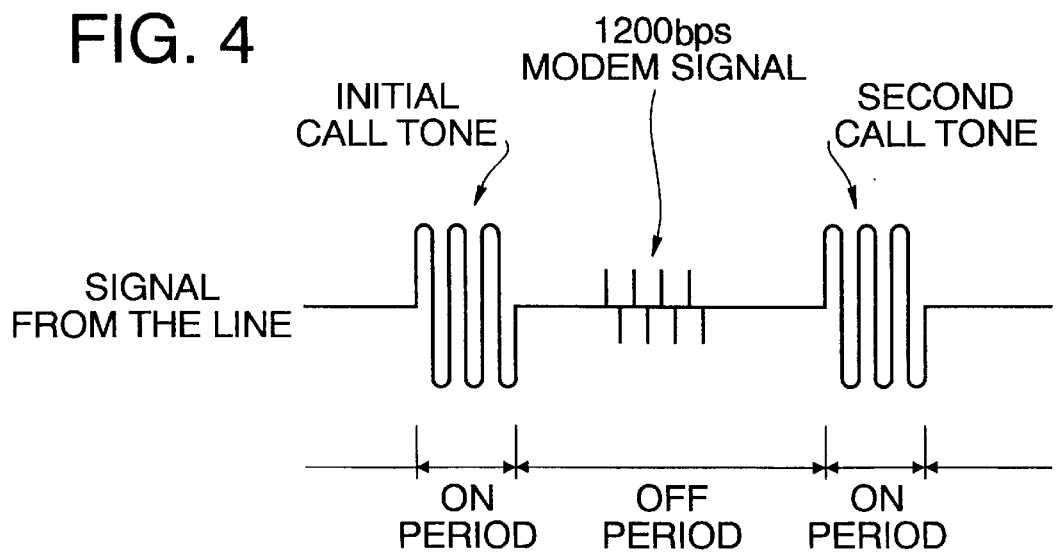
FIG. 4 is an explanatory diagram of the call tone and modem signals.

As shown in FIG. 4, the call tone is an intermittent ring signal that is transmitted to the called station from a central exchange office based on the call from the caller and is transmitted for a predetermined time period after a predetermined pause period. Also, in North America, a service called Caller-ID is in operation using the telephone lines. This service transmits data such as the telephone number of the caller and communication time from the central exchange office to the called station as a 1200 bps modem signal during the ring off period of the aforementioned call tone.

As shown in FIG. 1, an image scanner 8 optically reads the image on the document set on the document supporter. A printing part 18 carries out printing on the recording paper based on received image data and image data scanned by the scanner 8. Operation part 6 is provided with a cipher switch 6a that selects the cipher communication mode, ten-keys, a one touch dial switch, a transmission switch and the like. A display part 7 including a liquid crystal display is for displaying various types of information.

Next, the operations of the facsimile device constructed as described above will be described.

Figure 2:
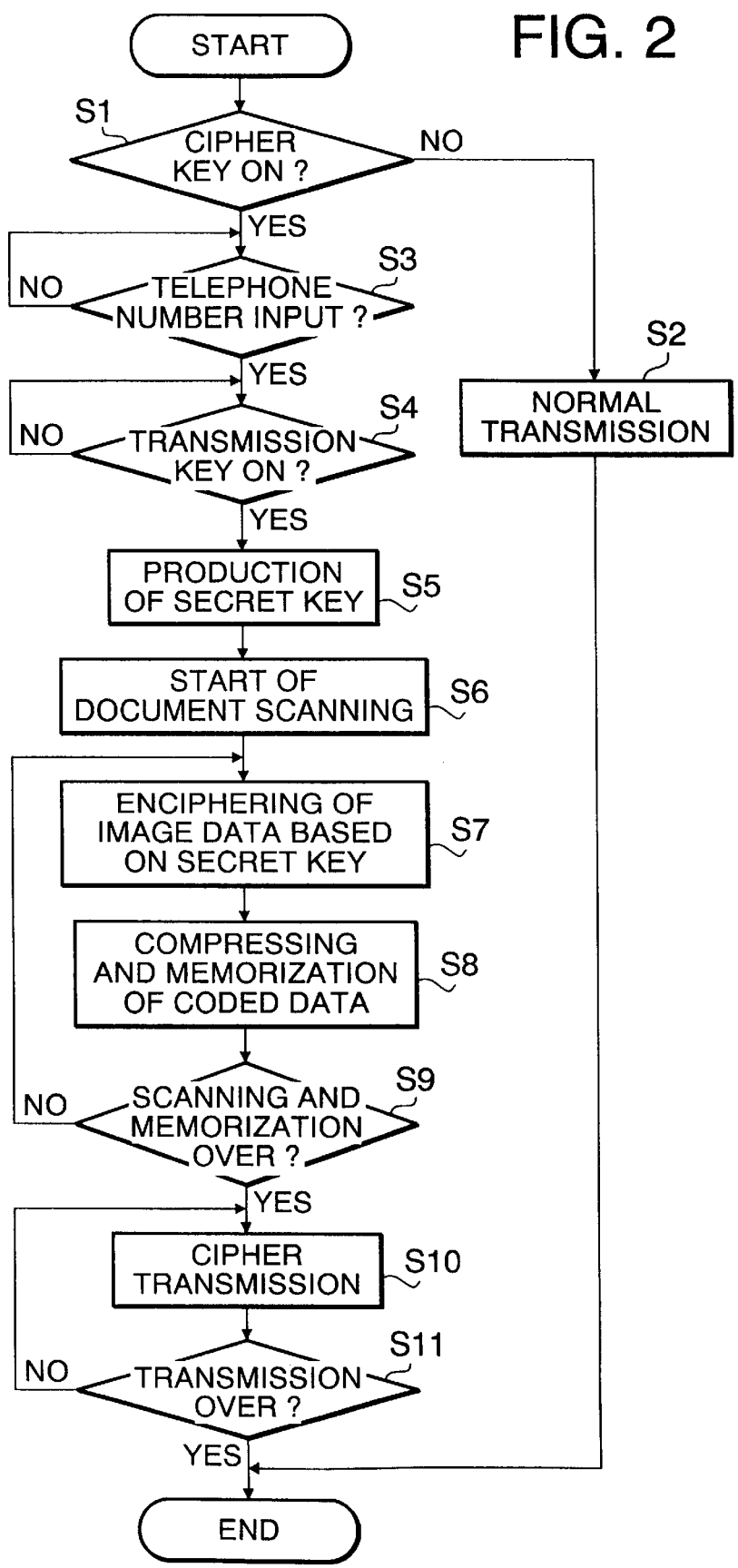
FIG. 2 is a flow chart showing the transmission processing of the first embodiment.

When transmission is carried out on a facsimile device thus embodied, transmission processing is carried out under the control of the signal processor 1 in accordance with the flow chart shown in FIG. 2. In short, whether the cipher switch 6a of the operation part 6 is ON or not is determined and when the cipher switch 6a is in the OFF state, normal facsimile transmission operations are executed. In other words, the image data on the document scanned at the scanner 8 is transmitted without being enciphered and operations finish after that transmission has finished (steps S1,S2).

When the cipher switch 6a is in the ON state, the other party's telephone number is entered by operation of the ten-keys (numeric pad) or one touch dial key of the operation part 6 and the transmission switch is turned ON (steps S3, S4). Accordingly, a secret key is produced by the key production means 17 based on the telephone number of the machine itself pre-memorized in the RAM 4 and the aforementioned entered telephone number of the other party (step S5).

Next, scanning of the document set in the document supporter is started (step S6). Then that scanned image data is sequentially enciphered by the coder 14 based on the aforementioned produced secret key (step S7).

In continuation, the enciphered data is then sequentially compressed by the compressor/expander 16 by a predetermined compressing method and then memorized in the image memory 5 (step S8). Afterwards, determination of whether the scanning of all of the documents set in the document supporter or memorization of the compressed data in the image memory 5 has been completed or not (step S9) is performed and until these are finished, the operations of the aforementioned steps S7–S9 a repeated.

If the determination of the aforementioned step S9 is YES, enciphered transmission is started (step S10). In short, relay 19 closes and a dial transmission is carried out in accordance with the aforementioned entered telephone number. Then, after a line to the called station has been made, the coded data is read out from the image memory 5 and that coded data is transmitted via the telephone lines L. Afterwards, determination of whether the transmission of coded data has been completed or not is carried (step S11) and all operations cease at the point when transmission has been completed.

In this way, when the image data has been enciphered and transmitted, even supposing the communication image data is being intercepted, the secrecy of the image data can be maintained providing the enciphering key is not known as the intercepted data is coded data.

Also, at the caller, if the machine's own telephone number is pre-registered in the RAM 4, for cipher communication, by simply entering the telephone number of the other party, that is, the called station, a secret key necessary for the enciphering of the data is automatically produced. Consequently, cipher communication can be carried out by simply executing an operation similar to that for normal communication without needing any special operation.

Figure 3:
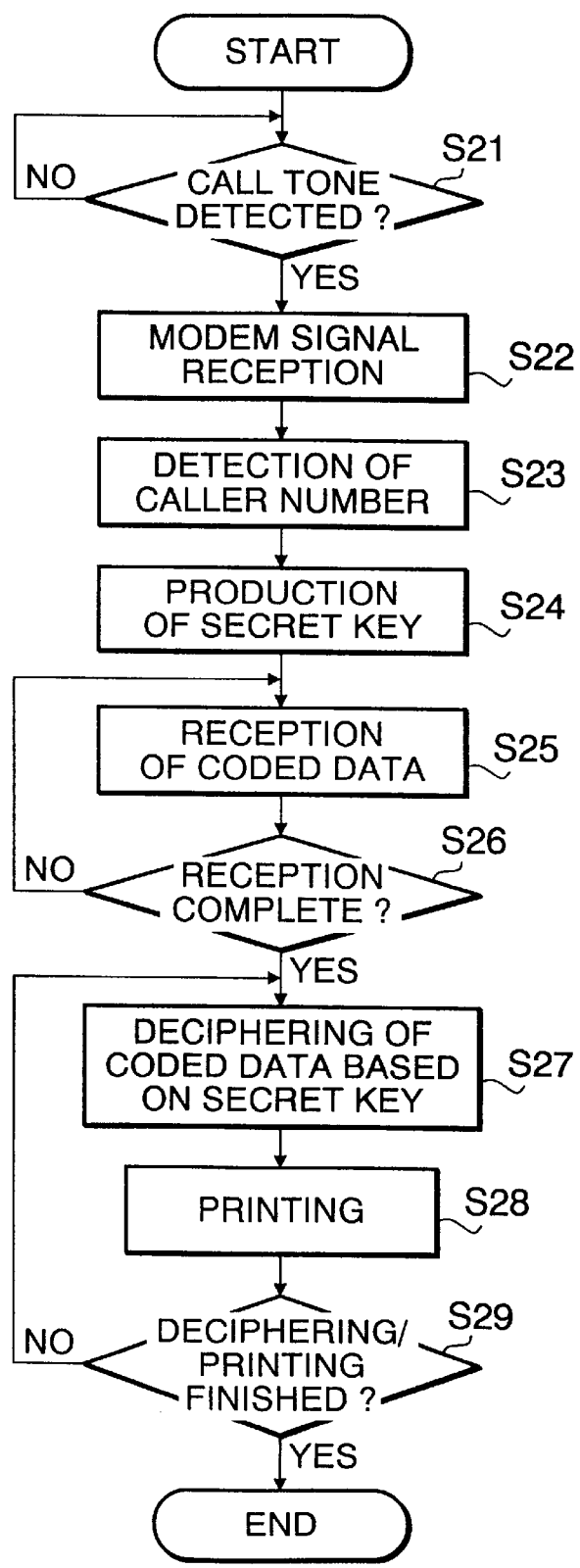
FIG. 3 is a flow chart showing the reception processing of the first embodiment.

Next, the operations of when coded data transmitted by the aforementioned transmission operations is received will be explained in accordance with the flow chart of FIG. 3. The reception processing of this FIG. 3 is executed under the control of the signal processor 1.

When a call tone transmitted from the central exchange office based on a call from the caller is detected by the call tone detection circuit 13 (step S21), the modem signal transmitted in the ring off period of the call tone is received in the modem processor 10 via the AC coupler 11 (step 22). This signal is then demodulated by the modem processor 10, the telephone number of the caller is detected from the same signal (step S23) and a secret key is produced in the key production part 17 based, on the detected telephone number of,the caller and the telephone number of the machine itself which is pre-memorized in the RAM 4(step 24).

Afterwards, the relay 19 is closed, a line to the caller is made and reception of the coded data begins (step S25). At this point, the received coded data is sequentially memorized in the image memory 5. Once reception is complete (step S26), relay 19 opens and while the coded data is being read from the image memory 5, the coded data is deciphered based on the aforementioned produced secret key (step S27). The deciphered image data is then sequentially printed on the recording paper by the printing part 18 (step S28). Once the deciphering and printing processes are complete (step S29), all the operations are concluded.

Thus, at the called station, if the telephone number of the machine itself is pre-recorded in the RAM 4, by only receiving the telephone number of the caller transmitted by the Caller-ID service, the secret key necessary for deciphering of the received coded data is automatically produced. Accordingly, even at the called station, a special operation is unnecessary for cipher communication.

Figure 5:
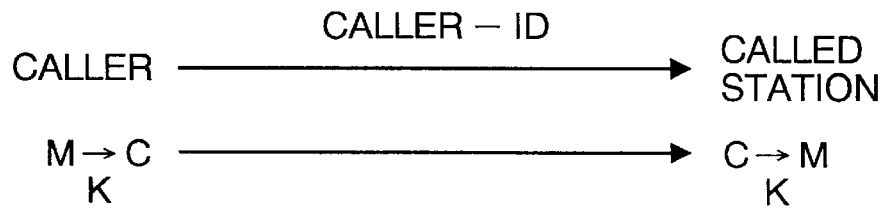
FIG. 5 is an explanatory diagram of the procedures of cipher communication of the first embodiment.

Based on FIG. 5, the above-mentioned cipher communication carried out between the caller and the called station will be further described. At the caller, a secret key K is produced based on the machine's own telephone number and the telephone number of the called station, the image data M is enciphered based on that secret key K and converted to coded data C. Then that coded data C is transmitted to the called station.

At the called station, the telephone number of the caller is detected by the Caller-ID service and a secret key K to be used in common with the caller is produced based on that telephone number and it's own telephone number. Then the received coded data C is deciphered based on that secret key K and converted to image data M.

In the communication method of the first embodiment as above, cipher communication can be carried out simply and reliably by similar procedures to normal facsimile communication without the necessity of troublesome input operations or arranging of the keys between the caller and called station Moreover, the key is automatically changed corresponding to the communicating parties and no management of keys is necessary even with a large number of those communicating parties.

Next, based on FIG. 6, a second embodiment of the present invention will be described.

This second embodiment is a communication method that, on the Caller-ID service, can realize the transmission of optional symbols and numbers registered by the caller in addition to the caller telephone number.

Figure 6:
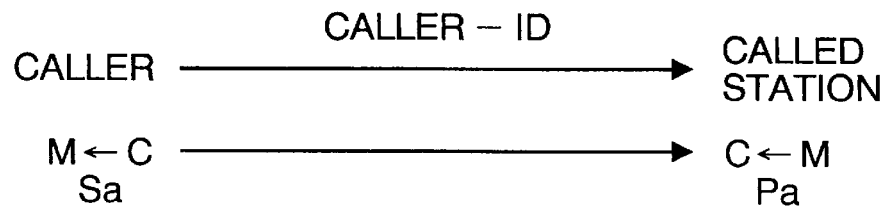
FIG. 6 is an explanatory diagram of the procedures of cipher communication of the second embodiment.

As shown in FIG. 6, when a call from the caller is executed, telephone number data of the caller and symbols and number data transmitted during the ring off period of the call tone by the Caller-ID service is detected at the called station. That data is used in the same form as a public key Pa. The image data M is then enciphered based on that public key Pa and is transmitted to the caller after being converted to coded data C.

At the caller, a secret key Sa is produced based on the caller's own telephone number and the same symbol and number data as that transmitted to the called station. This data is pre-registered at the caller. When coded data C from the called station is received, the coded data C is deciphered based on the secret key Sa and converted into image data M. At this point, as the coded data C is deciphered only by the secret key Sa produced at the caller, the coded data C can not be deciphered even if the aforementioned public key Pa has been intercepted.

Even in this second embodiment, cipher communication can be easily and reliably carried out between the caller and called station similar to the aforementioned first embodiment without the need for either an input operations or for arranging of the keys between the caller and the called station. Further, in this second embodiment, so-called communication that transmits data from the called station in response to a demand from the caller is carried out, which is convenient when it is not desirous for a third party to know about the reception data as the coded data C can be received and printed out when the caller so requests.

Figure 7:
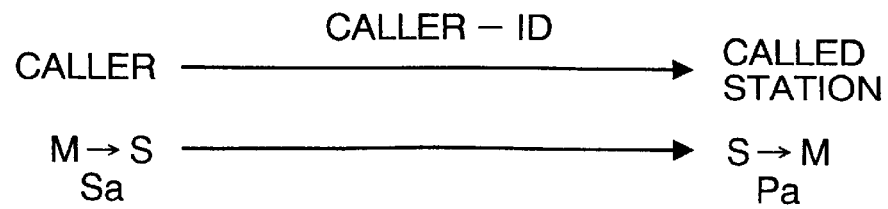
FIG. 7 is an explanatory diagram of the procedures of cipher communication of the third embodiment.

Next, a third embodiment of the present invention will be described based on FIG.7.

Similar to the aforementioned second embodiment, the third embodiment is a communication method that, on the Caller-ID service, can realize the transmission of optional symbols and numbers registered by the caller in addition to the caller telephone number.

At the caller, a secret key Sa is produced based on the pre-registered telephone number of the machine itself and the symbol and number data. The image data M is enciphered based on that secret key Sa and converted into coded data S. Then the coded data S is transmitted to the called station.

At the called station, the telephone number of the caller and the symbol and number data transmitted during the ring off period of the call tone by the Caller-ID service is detected and that data is used in the same form as a public key Pa. Then when the coded data S from the caller is received, the coded data S is deciphered based on that public key Pa and converted into image data M.

It should be noted that this communication method is known as authentication communication and the coded data S of this authentication communication is called authentication data S. In short, the authentication data S is data that can be deciphered by anyone who knows the public key Pa, herein the public key Pa is data transmitted to the called station by the Caller-ID service. However the authentication data S can also only be deciphered by the public key Pa being the data expressed by the caller and therefore identifying it. Accordingly, the fact that the received authentication data S could be deciphered is confirmation that the party that transmitted that authentication data S is the same as the party that is indicated by the used public key Pa. Consequently, this communication method differs from cipher communication and is known as authentication communication.

Similar to the aforementioned first and second embodiments, when the caller and called station carry out cipher communication (authentication communication) on this third embodiment, authentication communication can be easily and reliably carried out without needing arrangement or an input operation of a key.

It should be noted that it is also possible to realize the present invention with the following alterations.

(1) In the first embodiment, transmission of coded data from the called station to the caller. With this arrangement, as in the second embodiment, the caller is able to receive data from the called station when it so requests.

(2) Application of the present invention to the cipher communication of moving pictures, sounds and text data. Ciphered communication can be easily and reliably carried out even when the present invention is applied to the cipher communication of this kind of data.

(3) An arrangement such that, when the received coded data is stored in the image memory 5, the deciphering and printing out of coded data cannot be performed if a predetermined password is not entered. Accordingly, the secrecy of the coded data can be reliably maintained.

The following technical innovation can be understood from the aforementioned embodiments.

(1) A communication method where a caller produces a secret key based on data including the caller's own telephone number and transmits the data after enciphering the data based on that secret key, a called station uses data including the telephone number of the caller transmitted during the ring off period of the call tone for a public key and deciphers the received coded data based on that public key. As a consequence, authentication communication can be easily and reliably carried out.

(2) A communication device that enciphers data based on a predetermined key and transmits that data and deciphers received coded data based on a predetermined key, provided with a key production means for producing a key based on data including at least it's own telephone number when a calling station and for producing a key based on data including at least the telephone number of the caller that is transmitted during the ring off period of call tone when a called station.

If this kind of communication device is used with the caller and called stations, cipher communication can be easily and reliably carried out.

What is claimed is:

1. A communication method that enciphers data based on a predetermined key and transmits the data as well as deciphering received coded data based on a predetermined key, comprising the steps of:

producing, at a caller side, said key based on data including at least a telephone number of the caller; and producing, at a receiver side, said key based on data including at least the telephone number of the caller that is transmitted during ring off periods of call tone.

2. The communication method as recited in claim 1, wherein the caller produces a secret key based on the telephone number of the caller and the telephone number of the receiver and transmits the data after enciphering the data based on the caller's secret key, and wherein the receiver produces a secret key based on the telephone number of the receiver and the data including the telephone number of the caller that is transmitted during the ring off period of the call tone and deciphers the received coded data based on the receiver's secret key.

3. The communication method as recited in claim 1, wherein the receiver uses data including the telephone number of the caller that is transmitted in the ring off period of the call tone as a public key and transmits its data after enciphering the data based on said public key, and wherein the caller produces a secret key based on data including the caller's own telephone number and deciphers the received coded data based on that secret key.

4. The communication method as recited in claim 1, wherein the caller produces a secret key based on data including the caller's own telephone number and transmits its data after enciphering the data based on that secret key, and wherein the receiver uses data including the telephone number of the caller that is transmitted in the ring off period of the call tone as a public key and deciphers the received coded data based on that public key.

5. A communication apparatus that enciphers data based on a predetermined key and transmits the data as well as deciphering received coded data based on a predetermined key, comprising:

first key production means for producing a key based on data including at least a telephone number of the communication apparatus when the communication apparatus functions as a caller; and second key production means for producing a key based on data including at least the telephone number of the caller transmitted during a ring off period of a call tone when the communication apparatus functions as a receiver.

6. The communication method as recited in claim 1, 2, 3 or 4, wherein the coded data received and memorized in an image memory cannot be decoded or printed out unless a predetermined password is input.

7. The communication apparatus as recited in claim 5, wherein the coded data received and memorized in an image memory cannot be decoded or printed out unless a predetermined password is input.

* * * * *